(12) United States Patent
Gorniak

(10) Patent No.: US 7,073,927 B1
(45) Date of Patent: Jul. 11, 2006

(54) BACKUP MIRROR ACCESSORY

(76) Inventor: Jerry T. Gorniak, 2317 E. 43rd St., Erie, PA (US) 16510

( * ) Notice: Subject to any disclaimer, the term of this patent is extended or adjusted under 35 U.S.C. 154(b) by 104 days.

(21) Appl. No.: 10/795,056

(22) Filed: Mar. 5, 2004

(51) Int. Cl.
*B60Q 1/26* (2006.01)
*B60R 1/12* (2006.01)

(52) U.S. Cl. .................. 362/494; 362/140; 362/184; 362/800; 362/259; 362/276; 362/464; 340/425.5

(58) Field of Classification Search ............ 340/932.2, 340/435, 463, 464, 479, 425.5, 557; 362/494, 362/464, 485, 540, 541, 545, 140, 144, 184, 362/225, 800, 259, 276; 348/148; 359/838, 359/841
See application file for complete search history.

(56) References Cited

U.S. PATENT DOCUMENTS 1,588,673 A * 6/1926 Gingrich ..................... 359/608
4,916,430 A * 4/1990 Vu et al. ..................... 340/463
5,355,284 A * 10/1994 Roberts ........................ 362/30
6,614,579 B1 * 9/2003 Roberts et al. ............. 359/267

FOREIGN PATENT DOCUMENTS

| FR | 2468172 A | * | 5/1981 |
| JP | 11125671 A | * | 10/1997 |
| WO | WO 87/10342 | * | 3/1987 |
| WO | WO 89/11984 | * | 12/1989 |

* cited by examiner

*Primary Examiner*—Sandra O'Shea
*Assistant Examiner*—Sharon Payne
(74) *Attorney, Agent, or Firm*—Richard K Thomson

(57) ABSTRACT

An accessory attachable to a backup mirror provides safety features to reduce vehicular accidents and includes a high density light bar 22 extending in vertically; a halogen bulb 24 directed laterally of the vehicle to illuminate the region immediately adjacent the vehicle; a strobe bar 26; a series of red LED lights 28 extending about the periphery of accessory 20; a laser light 30 mounted by a spring 32 in vertically oblong slot 34; and a graphic depiction 36 of the narrowing distance between the rear bumper 13 of vehicle 11 and building 15.

10 Claims, 4 Drawing Sheets

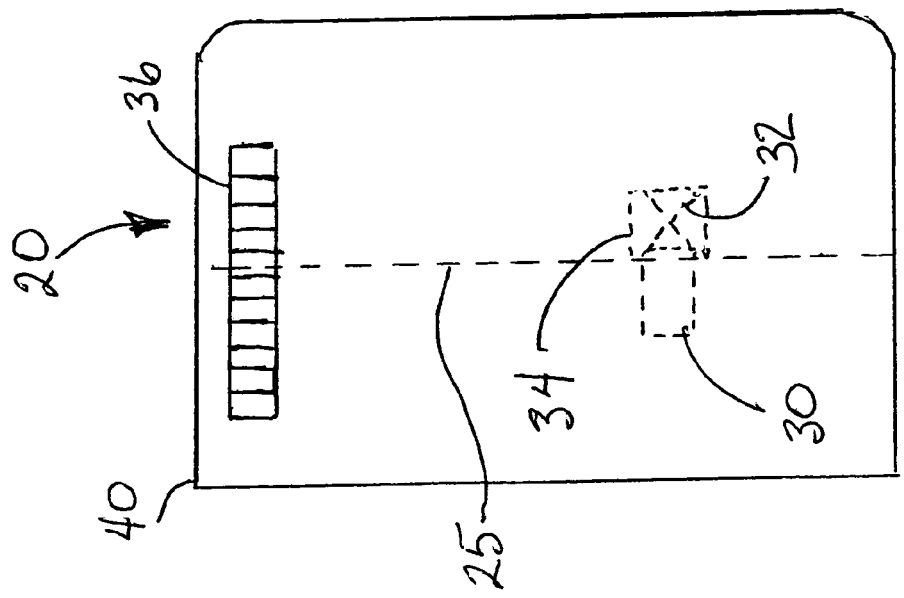
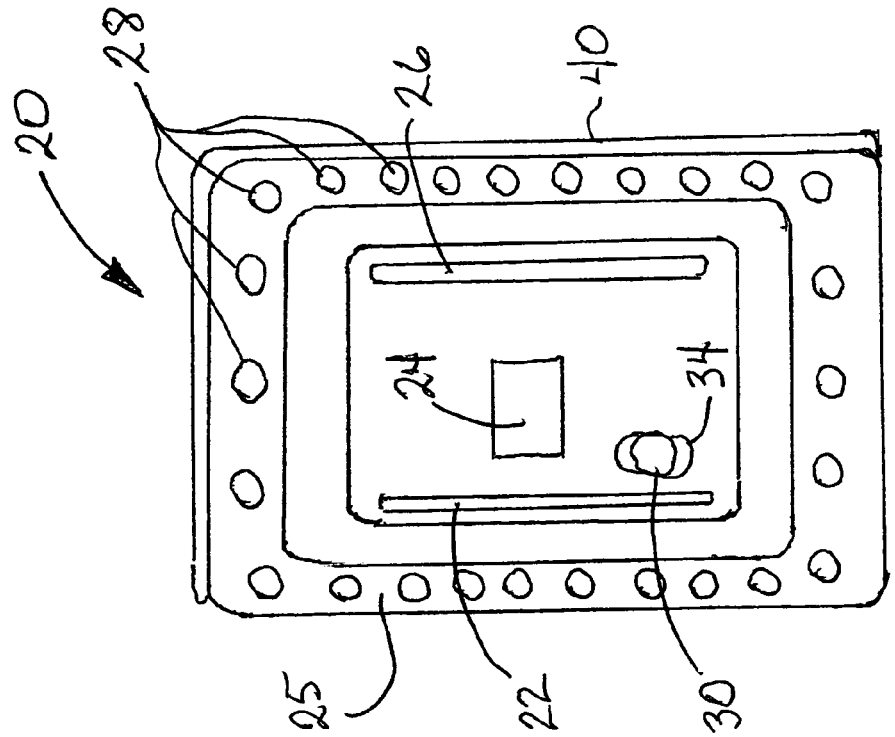

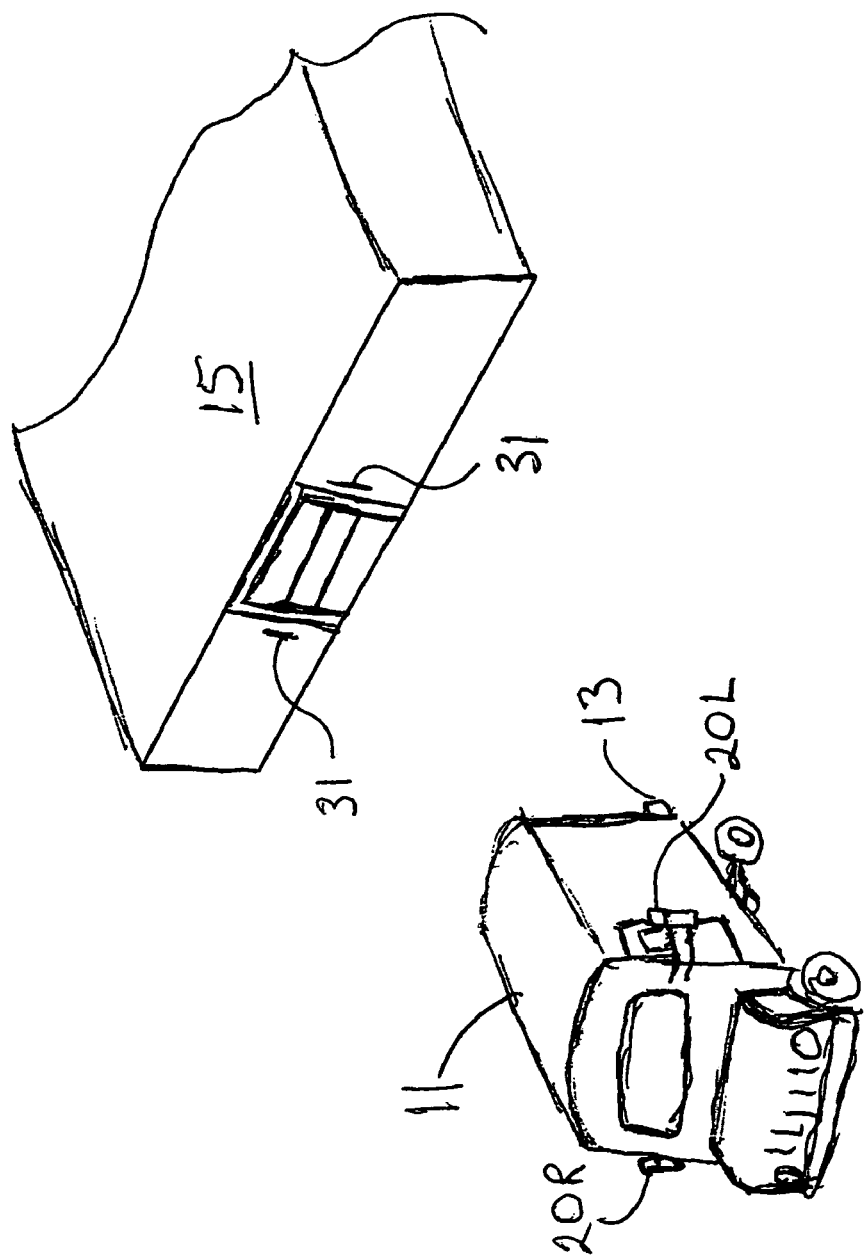

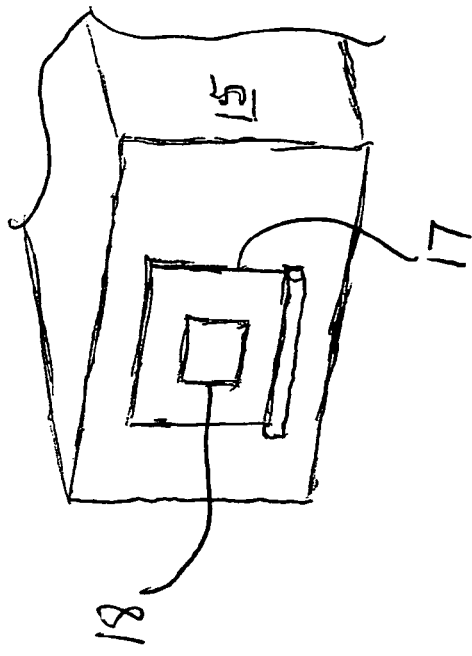
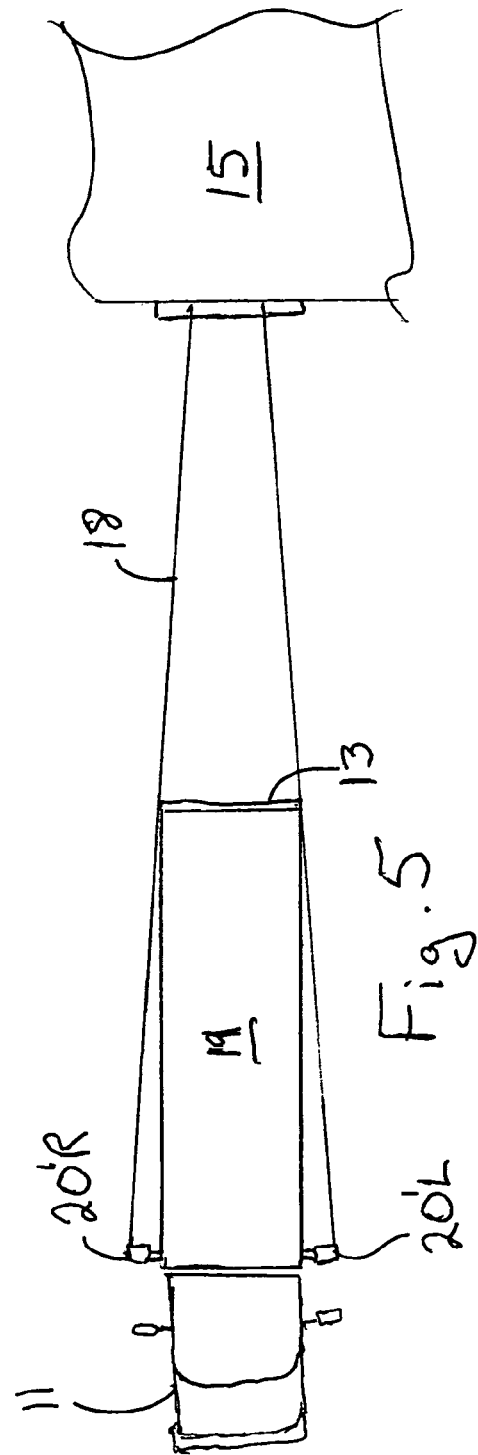
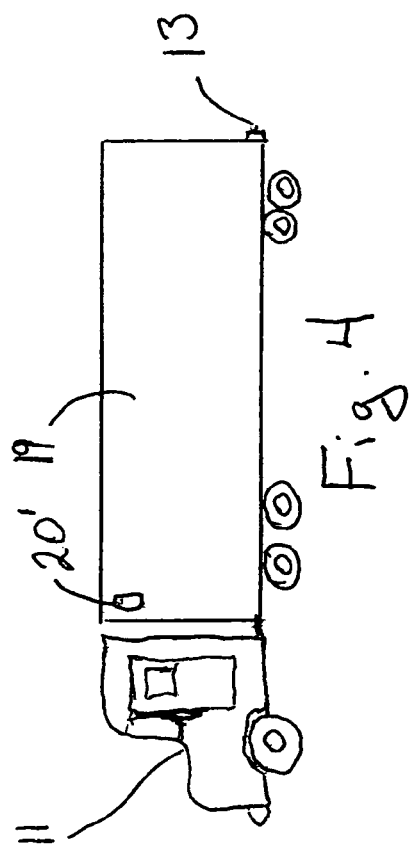

BACKUP MIRROR ACCESSORY

BACKGROUND AND SUMMARY OF THE INVENTION

The present invention is directed to backup mirror accessory. More particularly, the present invention is directed to additional lighting features which can enhance the safety for vehicles which backup frequently, such as snow plows and semi-tractor trailers.

A hazard which plagues drivers of large vehicles including RVs, snow plows and semi-tractor trailers, is not knowing precisely where the extremities of their vehicles are and, in low light levels, not being able to see what is near the peripheries of their vehicles. This is particularly a problem when operating the vehicle in reverse. This lack of information can produce accidental contacts with objects in or near the path including other vehicles, passers by, and buildings.

It is the object of the present invention to provide an accessory for a backup mirror which will increase a driver's awareness of where the extremities of her/his vehicle is and what is around the vehicle, thereby reducing the incidence of accidents. Further, several of the features will make it obvious to passers by that the vehicle is initiating a backup procedure. The accessory has one or more features which can be built into, attached to, or simply used with side mounted backup mirrors. Alternatively, one or more of the features may be incorporated into a stand alone, battery-operated unit which can be magnetically attached to each side of a tractor trailer.

The present invention comprises an accessory for a backup mirror of a vehicle including at least one of the following enumerated elements: a white light beam illuminating a side region adjacent the vehicle, a white light source which is pulsed by a strobe attachment; a laser beam projected directly rearwardly of the vehicle to provide a reference for the vehicle's driver; a beam of white light directed rearward at a slight angle to a side portion of the vehicle to cast a distinct shadow which aids a driver in determining precisely where a rear bumper of her/his vehicle is; a series of red LED's encircling a reflective mirror portion of said backup mirror which are illuminated during at least one of the following: i) the vehicle is backing up, ii) a brake pedal is engaged; and a graphic representation indicating a narrowing of a distance between the rear bumper and a stationary object such as a loading dock.

In the preferred embodiment, a laser light which projects the laser beam is mounted on a spring permitting only vertical motion thereby bouncing when the vehicle is in rearward motion causing the laser light to produce a vertical line on a structure toward which the vehicle is backing. The white light beam illuminating a side region and the beam of white light directed rearwardly can be produced by a common white light source and may be removably attached to a side portion of a trailer. The white light source is preferably a battery powered light which is magnetically attachable to the side portion of the trailer. The series of red LED's are illuminated during brake engagement and when the vehicle is backing up. The accessory for a backup mirror preferably includes a shield element mounted on the mirror to screen the driver's view of the auxiliary lights which are mounted thereon to improve her/his night vision.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which FIG. 1 is a front view of a first embodiment of the backup mirror accessory of the present invention;

FIG. 2 is a side view of the first embodiment;

FIG. 3 is a perspective schematic of the first embodiment in use on a vehicle;

FIG. 4 is a schematic side view of a second embodiment in use;

FIG. 5 is a top view of the use depicted in FIG. 4; and

DETAILED DESCRIPTION OF PREFERRED EMBODIMENT(S)

Figure 6:
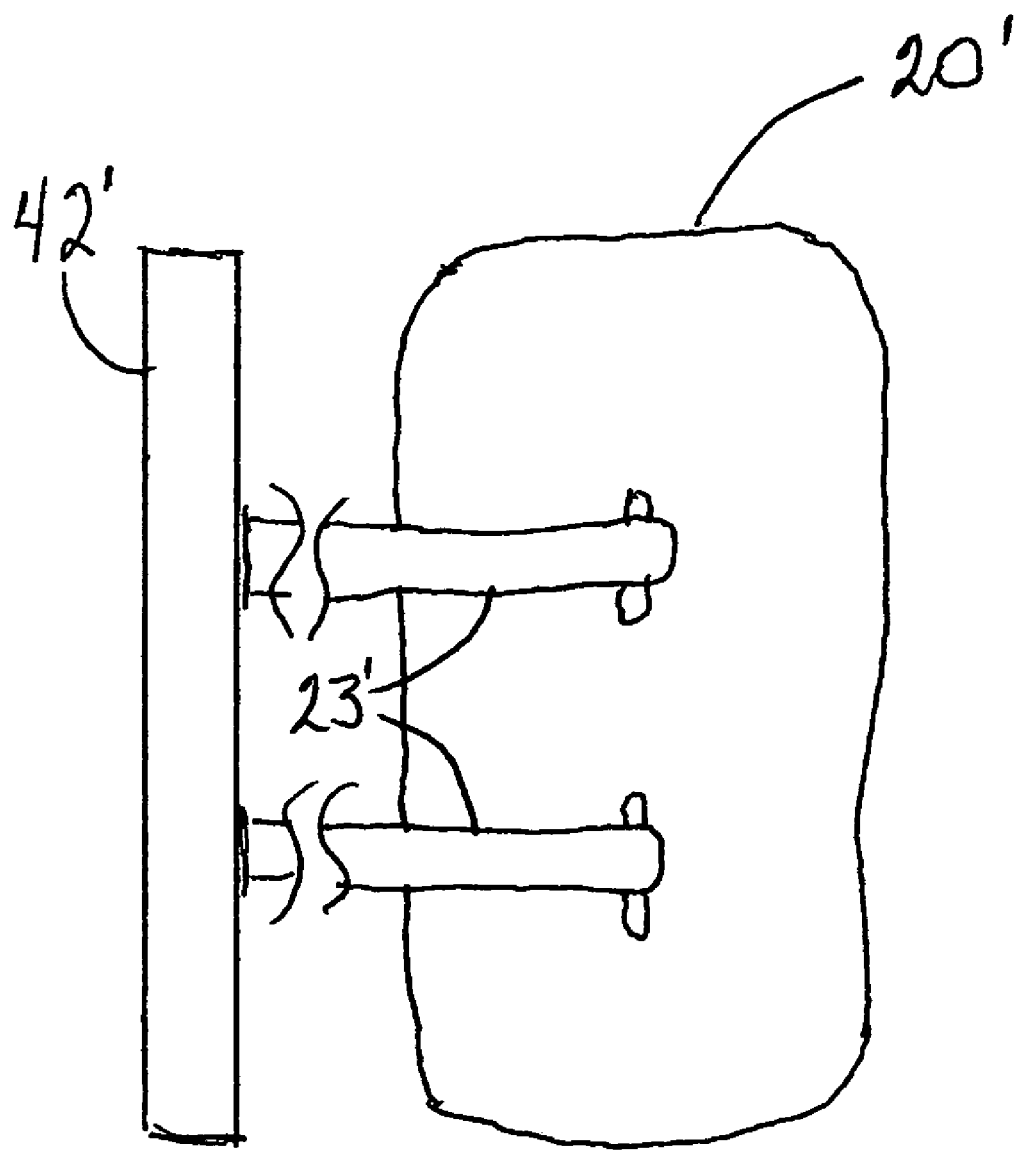
FIG. 6 is a rear view of the second embodiment.

A first embodiment of the backup mirror accessory of the present invention is shown in FIGS. 1 and 2 generally at 20. The first embodiment of backup mirror accessory 20 is depicted as a stand alone unit which can be attached to the backup mirror, above, below or beside, depending on the configuration of the particular mirror. This embodiment will be sold in the after market to retrofit existing vehicles with the capabilities of the present invention. It will readily be appreciated that the features described with regard to this after market embodiment could be built directly into an OEM backup mirror supplied with vehicles which have frequent need to operate in reverse, i.e., RVs, snow plows and semi-tractor trailers.

Backup mirror accessory 20 includes a number of safety features to facilitate operating a vehicle in reverse which should significantly reduce the incidence of accidents. These features include a high density light bar 22 extending in vertically; a halogen bulb 24 directed laterally of the vehicle to illuminate the region immediately adjacent the vehicle; a strobe bar 26; a series of red LED lights 28 extending about the periphery of accessory 20; a laser light 30 mounted by a spring 32 in vertically oblong slot 34; and a graphic depiction 36 of the narrowing distance between the rear bumper 13 of vehicle 11 and building 15.

These items operate as follows. High density bar 22 will cast a shadow, during night operation, which will grow as the vehicle nears the building and will enable the vehicle operator to guide the rear bumper 13 into alignment with door 17 by steering the shadow to a position where it is centered on the door (FIG. 5). It will be appreciated that it is essential that both backup mirrors 20R and 20L be equipped with accessories 20 for optimum performance. Halogen bulb 24 will be directed to illuminate the zone immediately adjacent the vehicle 11. It will be apparent that alternate high intensity light sources could be substituted for the halogen bulb without departing from the spirit of the invention. This will reduce the incidence of hitting items (vehicles, pedestrians) who are hidden in the night shadows beside the vehicle 11.

The strobe 26 and the series of red LEDs 28 are intended to alert pedestrians walking beside/behind the vehicle 11 (particularly during daytime operation) that the vehicle is in the process of initiating/performing a backing operation. Accordingly, the strobe 26 and LEDs 28 will be linked to the reverse gear of vehicle 11. Laser 30 is spring mounted in a vertically oblong slot 34 to induce a vertical bouncing as the vehicle is backing. Alternatively, the strobe 26 and/or the LEDs 28 can be activated by touching the brake. This movement will produce a vertical line 31 on each side of the vehicle 11 enabling the operator to properly position the bumper 13 even during daylight operation when light bar 22 will be ineffective at casting a shadow. A shield element 40 extends around the portion of the periphery of accessory 20 a sufficient axial extent needed to block the direct vision of the operator preserving her/his night vision.

A graphic depiction 36 representing the narrowing gap between bumper 13 and building 17 is shown here mounted on shield 40, although, obviously, alternate mounting positions are possible. When this feature is included, the circuitry for laser 30 will include a collector for gathering reflected laser light and will subtract the distance to the bumper 13 in computing the closing distance for the graphic depiction 36, in the manner of laser room measuring devices. This feature can be made adjustable, allowing the operator to input the vehicle length, or automatic by positioning the collector in the vicinity of the bumper 13.

A second embodiment of the backup mirror accessory of the present invention is shown in FIG. 6 generally at 20'. This embodiment is a free standing, battery-operated unit, equipped with a magnetic base 42' which enables it to be attached to portions of the semi-tractor trailer 19 for backing operations and then dismounted and stored for road operations. The second embodiment 20' may be equipped with any or all of the features included in the first embodiment, but will include the high intensity light bar to cast shadow 12.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. An accessory for a backup mirror of a vehicle for enhancing safety when the vehicle is backing up, said accessory comprising:

a laser light projecting a laser beam directly rearwardly of the vehicle to provide a reference for the vehicle's driver, said laser light being mounted on a spring which permits only vertical motion thereby bouncing when the vehicle is in rearward motion causing said laser light to produce a vertical line on a structure toward which the vehicle is backing.

2. The accessory for a back up mirror of claim 1 further comprising at least one additional element from the following enumerated elements:

a) a high intensity light illuminating a side region adjacent the vehicle:
b) a white light source which is pulsed by a strobe attachment to warn pedestrians adjacent the vehicle that a backup maneuver is in progress;
c) a beam of white light directed rearward at a slight angle to a side portion of the vehicle to cast a distinct shadow which aids a driver in determining precisely where a rear bumper of her/his vehicle is;
d) a series of red LED's encircling a reflective mirror portion of said backup mirror which are illuminated during at least one of the following:
  i) the vehicle is backing up
  ii) a brake pedal is engaged; and
e) a graphic representation indicating a narrowing of a distance between the rear bumper and a stationary object such as a loading dock.

3. The accessory for a backup mirror of claim 2 further comprising a sensor for collecting laser light reflected from an object toward which the vehicle is backing, a device for computing a distance between the object and the rear bumper of the vehicle, a display to provide said graphic representation of the narrowing distance there between.

4. The accessory for a backup mirror of claim 2 wherein said beam of white light directed rearwardly is part of a stand alone, battery-operated unit attachable to a side portion of a trailer.

5. The accessory for a backup mirror of claim 4 wherein said stand alone, battery-operated unit is removably attachable to the side portion of the trailer using a magnetic base.

6. The accessory for a backup mirror of claim 2 said series of red LED's are illuminated during brake engagement and when the vehicle is backing up.

7. The accessory for a backup mirror of claim 2 wherein said accessory includes at least two additional of the enumerated elements.

8. The accessory for a backup mirror of claim 7 wherein said accessory includes at least three additional of said enumerated elements.

9. The accessory for a backup mirror of claim 7 wherein said accessory includes all of said additional enumerated elements.

10. The accessory for a backup mirror of claim 2 further comprising a shield element mounted on said mirror to screen the driver's view of said auxiliary lights which are mounted thereon to improve her/his night vision.

* * * * *